Figures 7, 8:
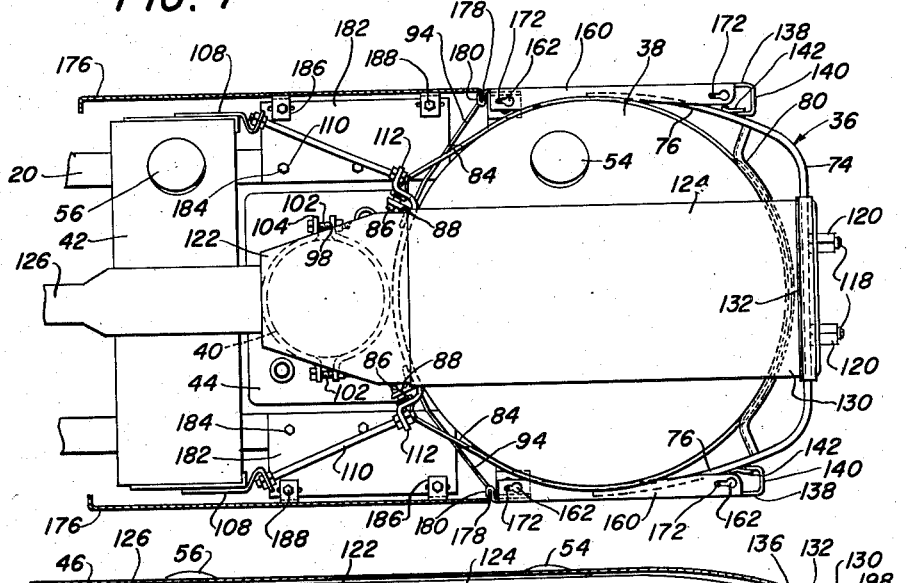

Feb. 3, 1959     W. H. DU SHANE     2,871,967
TRACTOR WITH FRONT MOUNTED FUEL TANK
Filed April 11, 1955     4 Sheets-Sheet 1
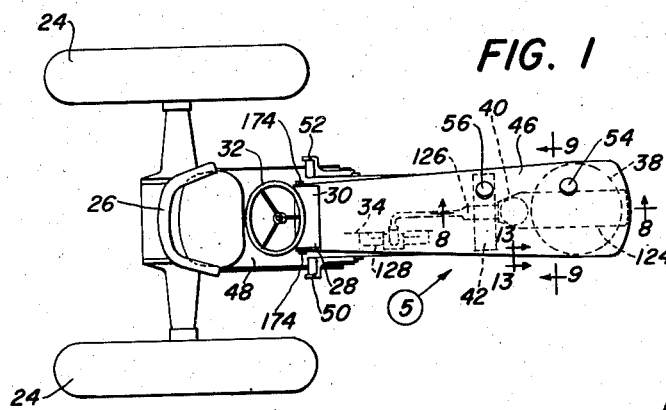
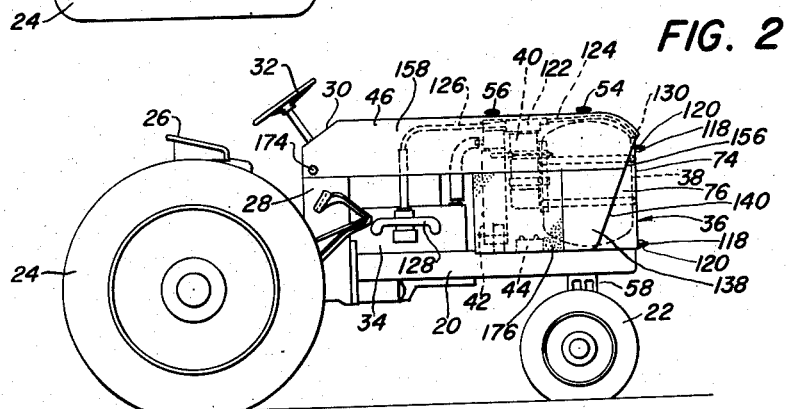
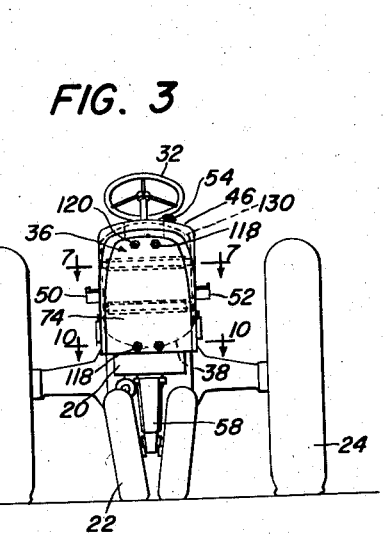
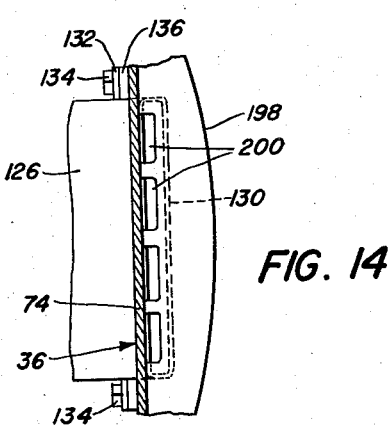
INVENTOR.
W. H. DU SHANE

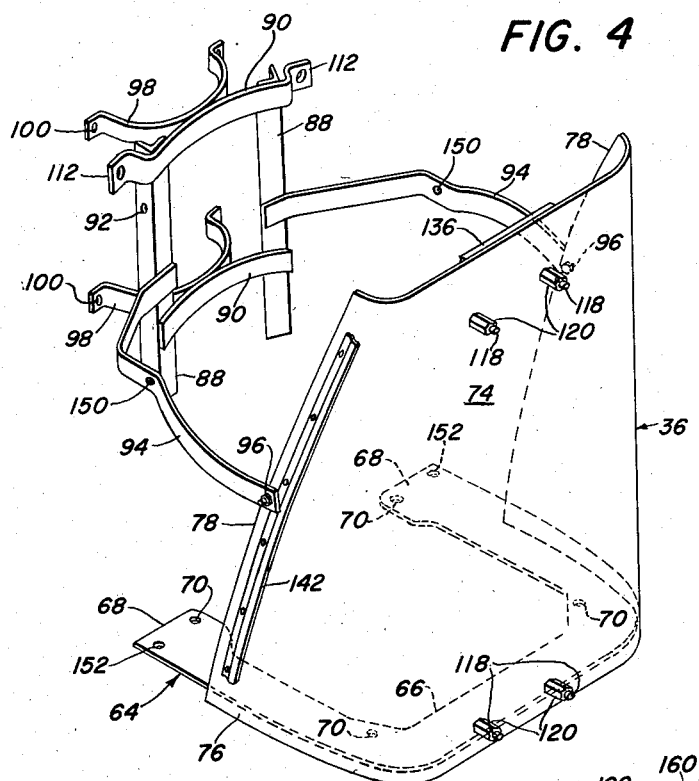
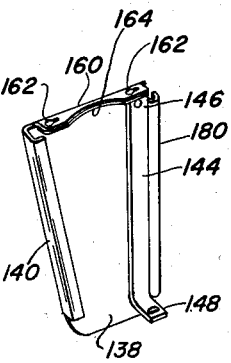
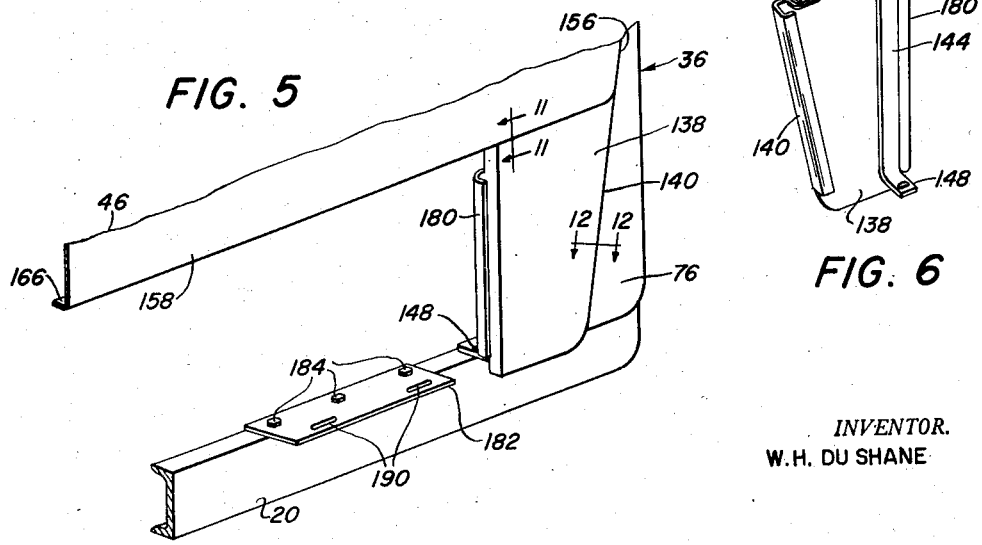
FIG. 4
FIG. 5
FIG. 6
INVENTOR.
W. H. DU SHANE

Feb. 3, 1959 W. H. DU SHANE 2,871,967
TRACTOR WITH FRONT MOUNTED FUEL TANK
Filed April 11, 1955 4 Sheets-Sheet 3

INVENTOR.
W. H. DU SHANE

Feb. 3, 1959 W. H. DU SHANE 2,871,967
TRACTOR WITH FRONT MOUNTED FUEL TANK
Filed April 11, 1955 4 Sheets-Sheet 4
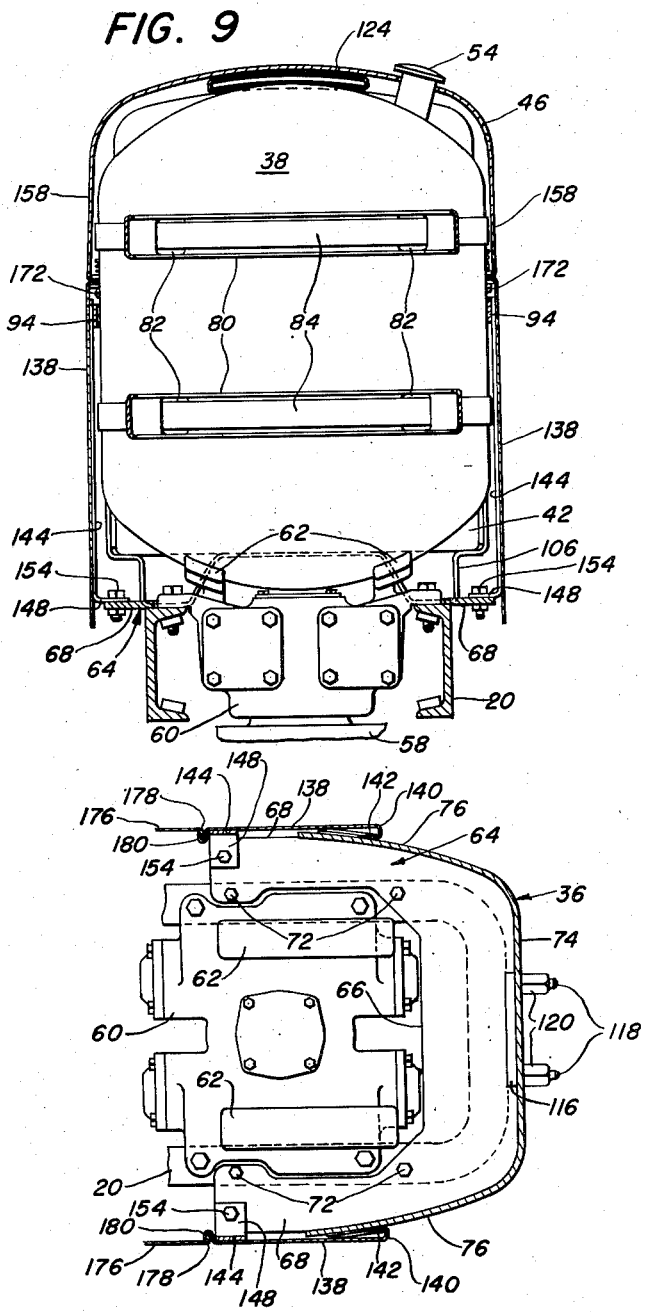
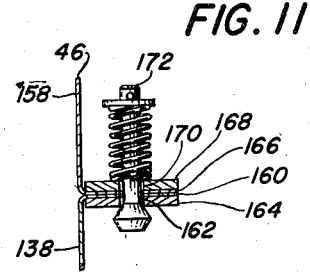
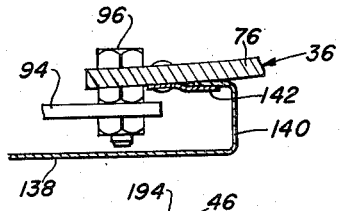
INVENTOR.
W. H. DU SHANE

United States Patent Office 2,871,967
Patented Feb. 3, 1959

2,871,967

TRACTOR WITH FRONT MOUNTED FUEL TANK

Wallace H. Du Shane, Waterloo, Iowa, assignor, by mesne assignments, to Deere & Company, a corporation of Delaware Application April 11, 1955, Serial No. 500,562

19 Claims. (Cl. 180—54)

This invention relates to vehicle construction and more particularly to an improved engine and body accessory arrangement especially adapted for an agricultural tractor.

The typical agricultural tractor comprises an elongated, relatively narrow main frame or body, supported at its front end on front wheel means and on its rear end on rear traction wheels. An operator's seat located laterally intermediate the traction wheels provides a vantage point from which the operator can readily see ahead as well as at both sides of the tractor, vision in this respect being particularly important in the use of the tractor in the cultivation of row crops. For these reasons, the conventional tractor has been fairly well standardized, characterized in that an elongated engine hood overlies an internal combustion engine carried on the tractor body midway between the front and rear wheels, the front portion of the hood terminating in an upright grille structure which serves also as a screen for the immediately rearwardly located radiator for the engine coolant. The rear portion of the hood includes or encloses a fuel tank for containing fuel for the engine.

According to the present invention, the basic design just described is departed from, to the extent that the front portion of the tractor serves as means for mounting an upright fuel tank, ahead of which is disposed a protective imperforate shield structure. This arrangement removes the fuel tank from its conventional location behind or above the engine and places it at the forward part of the tractor. This relocation has many advantages, the most important of which are that the forwardly located fuel tank, being spaced from the engine, does not constitute a fire or explosion hazard and, being relatively remote from engine heat and radiator blast, avoids loss of fuel through evaporation. The construction further features the utilization of support means between the upright shield structure, the forwardly located fuel tank, an air cleaner, the tractor radiator and other accessories, all of which are located in a relatively confined zone at the forward end of the tractor, thus enabling narrowing of the rear portion of the hood structure so that the operator's visibility at opposite sides of the tractor, as well as ahead of the tractor, is improved. This is particularly important in situations in which the tractor is fueled by the so-called LP gas, in which cases the fuel tank must be considerably larger than fuel tanks in tractors fueled with gasoline or similar fuels. The mounting of the air cleaner is particularly advantageous, since it is ahead of the radiator and therefore not exposed to the heat of radiator air blast, whereby the cleaner remains cool and improves the volumetric efficiency of the engine. Further, the mounting enables the use of a forwardly extending intake and a rearwardly extending air outlet, both the intake and the outlet being preferably concealed beneath the upper confines of the hood and the air intake finding its outlet in a concealed perforated marginal portion at the front end of the hood and forwardly of the upright shield structure.

Further features of the invention reside in means permitting ready removal of the hood as a unit, removable side sheets providing access to the accessory-receiving space longitudinally intermediate the fuel tank and radiator, the use of an imperforate shield structure as means for protecting the forward end of the tractor as well as means for affording attachment of implements and the like.

The foregoing and other important objects and desirable features inherent in and encompassed by the invention will become apparent as a preferred embodiment of the invention is disclosed in detail in the following description and accompanying sheets of drawings, the several figures of which will be described immediately below.

Fig. 1 is a plan view of the improved tractor.
Fig. 2 is a side elevational view of the same.
Fig. 3 is a front elevational view.
Fig. 4 is a perspective view, on an enlarged scale, showing the supporting shield and associated mounting structure.
Fig. 5 is a perspective view, on an enlarged scale, of the portion of the tractor designated generally by the encircled numeral 5 in Fig. 1.
Fig. 6 is a perspective view of one of the side sheet members for mounting in the structure of Fig. 5.
Fig. 7 is a sectional view, on an enlarged scale, as seen substantially along the line 7—7 of Fig. 3, the view in substance amounting to a plan view of the forward portion of the tractor with the hood removed.
Fig. 8 is a vertical sectional view of the forward portion of the tractor, drawn to an enlarged scale, as seen substantially along the line 8—8 of Fig. 1.
Fig. 9 is a transverse sectional view, drawn to the scale of Figs. 7 and 8, as seen along the line 9—9 of Fig. 1, the fuel tank, however, being shown in elevation.
Fig. 10 is a fragmentary sectional view, drawn to the scale of Figs. 7, 8 and 9, as seen substantially along the line 10—10 of Fig. 3.
Fig. 11 is an enlarged sectional view as seen substantially along the line 11—11 of Fig. 5.
Fig. 12 is an enlarged fragmentary sectional view as seen substantially along the line 12—12 of Fig. 5.
Fig. 13 is a sectional view as seen along the line 13—13 in Fig. 1, the view being drawn to a scale enlarged over that of Fig. 1.
Fig. 14 is a fragmentary sectional view as seen along the line 14—14 of Fig. 8.

The inventive structure is shown in association with a vehicle or tractor having a relatively narrow, fore-and-aft extending body 20 supported at its front end on front wheel means 22 and supported at its rear end by laterally spaced apart traction wheels 24. The tractor shown is of the so-called tricycle type in which the front wheel means is located to run between a pair of rows that are straddled by the traction wheels 24. However, these characteristics are relatively immaterial in the present case.

The rear portion of the body carries an operator's seat 26 ahead of which is an upright support 28 that affords an instrument panel 30 and that serves also to carry a steering wheel 32 by means of which the front wheel means 22 is steered.

An internal combustion engine 34 is carried by the body 20 ahead of the support 28, and the forward end of the engine terminates a substantial longitudinal distance rearwardly of an upright front shield structure 36 that is mounted on the front end of the body 20 in a manner to be subsequently described. As will appear generally from the dotted-line illustration in Figs. 1 and 2, the space between the engine 34 and the shield structure 36 accommodates in front-to-rear order a fuel tank 38, an air cleaner 40 and an upright transverse radiator 42 for the engine. Also visible in this space (Fig. 2) is an accessory, such as a battery 44 for lighting and ignition purposes. A longitudinal hood structure 46 extends fore and aft between the rear support 28 and the front shield structure 36 and overlies the engine, the radiator, the air cleaner and the fuel tank. As will be seen in Fig. 1, the hood is relatively narrow, particularly at its rear end. As will be brought out in greater detail below, the hood is removable as a unit from the support 28 and shield structure 36. It will be further noted that all of the components just described, including the fuel tank, air cleaner, radiator, battery and engine 34, are within the lateral width of the body 20 (Fig. 7).

The rear portion of the body, as at 48, just ahead of the operator's seat 26, is of increased width to afford platform room for the operator. Foot pedals 50 and 52, for controlling tractor drive mechanisms not material here, are located respectively at opposite sides of the platform 48.

Filling access to the fuel tank 38 and radiator 42 is afforded by filler necks capped at 54 and 56, respectively.

The front wheel means comprises a wheeled truck including a pair of closely spaced apart wheels supported on an upright pedestal 58, the upper portion of which is journaled on an upright axis in a steering gear housing 60. The details of the mechanism within the housing 60 are not pertinent here and have therefore been omitted. The housing 60 serves as a lower support for the fuel tank 38, having at its upper portion pad means in the form of a pair of curved pads 62 conforming to the partly spherical lower portion of the tank. In the preferred construction, the tank merely rests on the pads 62, which contributes to its ability to be removed upwardly after the hood 46 is removed.

Additional basic support for the tank 38 is afforded by means associated with the front shield structure 36, the details of which will be best understood from a consideration of Fig. 4. As seen in this figure, the shield structure 36 includes a U-shaped base 64 having a transverse front portion 66 and opposite integral rearwardly extending legs 68. The base is appropriately apertured, as at 70, for rigid affixation to the top surfaces of the front portion of the frame 20, cap screws 72 being used as fasteners (Fig. 10).

The shield structure 36 further includes an upright shield element made up of a transverse front wall 74 and opposite integral and rearwardly extending wing parts or side walls 76. The shield element 74—76 is constructed of relatively heavy plate to afford adequate protection for the forward end of the tractor, particularly for the fuel tank, which it embraces, as will be seen best in Fig. 7. The shield element is rigidly secured, as by welding along its lower edges, to the base 64 which is itself of relatively heavy plate. Thus, the shield structure affords a rigid supporting means at the forward end of the tractor. Each of the wings 76 has a downwardly and rearwardly inclined marginal edge 78 and the top edge (Fig. 4) is horizontal, the purposes of both of which features will be explained below.

As already indicated, the fuel tank 38 rests on the steering mechanism housing pads 62 and is embraced by the shield structure 36. A pair of arcuate members 80, having opposite ends bent as shown in Fig. 7, are rigidly secured, as by welding, to the inner surface of the shield structure 36 in vertically spaced relationship. As shown in Fig. 8, these members are channels and are appropriately slotted at 82 (Fig. 9) to receive upper and lower tank-supporting straps 84. Opposite ends of each strap are rigidly but removably secured, as at 86, to supporting structure including a pair of laterally spaced upright angles 88 rigidly joined together, as by welding, by vertically spaced arcuate straps 90. The numeral 92 in Fig. 4 designates one of an appropriate number of openings adapted to be used in effecting the connections at 86. The supporting structure made up of the members 88 and 90 may, if desired, be rigidly secured to the rear surface of the fuel tank 38. This supporting structure is tied to the shield structure 36 by a pair of side straps 94, the forward ends of which are secured to the respective wings 76 as by removable fasteners 96. The rear ends of the straps 94 may be welded to the angles 88 (Fig. 4). When the connections at 86 are tightened, the straps 84 are drawn tightly about the fuel tank 38, tying the fuel tank rigidly to the shield structure 36. At the same time, the supporting structure made up of the members 88 and 90 is rigidly secured to the tank, therefore affording a support for the air cleaner 40. To implement this support, the straps 90 carry semicircular bands or straps 98, opposite ends of each of which are apertured at 100 to receive removable fasteners in the form of bolts 102 cooperative with complementing straps 104, the whole tightly embracing the air cleaner 40, yet permitting removal thereof upon release of the fasteners 102.

The radiator 42 is located immediately to the rear of the air cleaner 40 and is supported by the frame 20 by means of a transverse support 106. The radiator has at each of its opposite sides an attaching clip or bracket 108 from which a tie bolt 110 extends forwardly, the forward end of each bolt being received in an apertured ear 112 formed integrally with the upper support strap 90 (Fig. 4). The tie bolts or members 110 act in both tension and compression and therefore tie the radiator rigidly to the supporting structure 88—90 and the supporting structure in turn is tied to the fuel tank and shield structure 36 as previously described. Thus, the forward portion of the vehicle, comprising the fuel tank 38, air cleaner 40 and radiator 42, is rigidly interconnected by supporting structure that remains confined within the relatively narrow lateral dimension of the tractor.

As best shown in Fig. 8, a transverse channel 114, appropriately secured at opposite ends to the side members of the body 20, supports the battery 44, the shape of the fuel tank 38 and the location of the bottom of the air cleaner 40 affording such accessory-receiving space, the accommodation of the battery 44 being merely representative of many accessories that could be so received.

Rigidly welded to upper and lower portions of the inner surface of the transverse front wall 74 of the shield structure 36 are transverse reenforcing strips 116, each of which carries a pair of forwardly extending, implement-mounting studs 118. Each stud carries a removable nut 120 thereon and thus enables the front shield structure 36 to assist in the supporting of many types of implements, it being already stated that the supporting structure 36, in connection with the base 64, is of relatively high strength design.

Although the air cleaner 40 is shown as being centrally located between opposite sides of the tractor, it could be disposed to either side of the longitudinal center line. In any event, it is positioned intermediate the fuel tank 38 and radiator 42. The air cleaner is equipped with a compound top 122 of any conventional construction, the details of which are not material here except to note that it accommodates both a forwardly extending air intake duct 124 and a rearwardly extending air outlet duct 126, the latter being connected in conventional fashion to an intake manifold 128 for the engine 34 (Figs. 1 and 2). The intake duct 124 is relatively flat in a vertical dimension and relatively wide in a transverse dimension (Fig. 9) and extends forwardly over the top of the fuel tank 38, curving slightly downwardly to an intake end 130. An appropriate strap 132 has the shape of an inverted U and has opposite legs removably secured, as by cap screws 134, to spaced apart portions of the upper marginal edge of the front wall 74 of the shield structure 36. As will be brought out in greater detail subsequently, the air cleaner conduit structure 122—124—126—130 is completely enclosed beneath the hood 46. A spacer 136, having tapped bores (not shown) for receiving the cap screws 134, is visible in Fig. 4 at the top of the front wall 74 of the shield structure 36. See, also, Fig. 8.

Side panels 138 form, in effect, rearward extensions, respectively, of the wings 76 of the shield structure 36. Each panel 138 is provided with an upwardly and forwardly inclined front edge which is formed as a marginal flange 140 bent back upon itself to hook rearwardly into a forwardly opening groove afforded by a mounting strip 142 on the associated wing 76. The top and bottom edges of the panel 138 are respectively in the horizontal planes of the top and bottom edges of the respective wing 76. Removable mounting of the panel 138 is accomplished by means of an upright member 144 having an apertured upper end 146 and an apertured bent lower end 148, these apertured portions respectively receiving cap screws which in turn are received respectively by an aperture 150 in the associated side strap 94 and an aperture 152 in the proximate side of the base 64 (Fig. 4). The lower cap screws are visible at 154 in Figs. 9 and 10.

The apertures 150 in the side straps 94 are preferably in the form of fore-and-aft, elongated slots. Likewise, the aperture in the bent lower end 148 of each upright member 144 is in the form of an elongated slot. These slots, in conjunction with the receipt of the marginal front edge or flange 140 in the mounting strip 142 permits slight fore-and-aft adjustment of the panel, whereby the panel may be properly alined with the front portion of the hood, which front portion includes rearwardly and downwardly sloping front edges 156 respectively on opposite sides 158 of the hood (Figs. 2 and 5).

Each panel has its upper edge in the form of an inturned flange 160 in which are provided two longitudinally spaced apart keyhole slots 162. The slots may be included in a reenforcing strip 164 (Fig. 11). Each side 158 of the hood 46 has a lower marginal flange 166, reenforced at 168, and provided with a pair of longitudinally spaced apertures 170, in each of which is mounted a spring-loaded headed pin 172. The pins are received respectively in the keyhole slots 162 and afford bayonet-type securing means. The rear end of the hood is secured at opposite sides to the instrument panel support 28 by removable fasteners, here in the form of cap screws 174 (Figs. 1 and 2). After the cap screws 174 are removed, the hood as a whole may be shifted forwardly, the keyhole slots accommodating the forward shifting and permitting escape of the headed ends of the pins 172, after which the hood may be lifted bodily from its position. Installation is accomplished in the reverse order. As already described, the panels 138 may be shifted to accommodate minor misalinement of the front edges 156 of the hood and the front edges 140 of the panels.

The panels 138 serve as enclosures for the opposite sides, respectively, of the front portion of the tractor, extending rearwardly alongside of the fuel tank 38. These panels are respectively supplemented by side sheet sections 176, each of which has an upright flanged front edge 178 received in a groove afforded by an upright flange 180 on the rear edge of the associated panel 138 (Figs. 6, 7 and 10).

Figs. 5, 7 and 13 illustrate the mounting of each side sheet section 176 with respect to the hood side 158 and the proximate side of the body 20. As shown, each side of the body 20 has a laterally outwardly extending plate or bracket 182, removably secured thereto as by bolts 184. The lower portion of the proximate side sheet 176 has rigidly secured thereto longitudinally spaced angles 186 which are bolted at 188 to the plate or bracket 182, the bracket having longitudinally elongated slots 190 to accommodate fore-and-aft adjustment. The upper edge of each side sheet 176 is flanged at 192 and has one or more upright pins 194 appropriately received by apertures 196 in the flange 166 of the hood side 158. Each side sheet 176 extends rearwardly past the rear portion tof the radiator 42 (Fig. 2), thus enclosing the radiator, the air cleaner and the accessory-receiving space below the air cleaner and intermediate the fuel tank and radiator. The side sheets are readily removable to provide access to this space, as for servicing the air cleaner and/or battery.

The front portion of the hood is formed as a downwardly and rearwardly turned rim 198, the under portion of which is apertured or perforated at 200 to afford concealed intake openings for the front or intake end 130 of the air cleaner intake conduit 124 (Figs. 8 and 14). Thus, although the air cleaner intake is concealed, it is located at a high point of the tractor and in addition to its functional aspects contributes also to the appearance of the tractor. The side sheets 176 are perforated or are in the form of screens to provide air inlets for the radiator 42. Thus, the radiator intake does not interfere with the air cleaner intake.

The major features of the invention have been outlined and others will appear from the foregoing description. Still others will occur to those versed in the art, as will numerous modifications and alterations in the preferred embodiment of the invention illustrated, all of which may be achieved without departing from the spirit and scope of the invention.

What is claimed is:

1. In a vehicle having a fore-and-aft body including a front end, the improvement comprising: an upright cylindrical fuel tank carried by the body adjacent to but spaced rearwardly from said front end; a wrap-around shield structure of U-shaped section having a terminal lower base secured to the body at the front end thereof and including a transverse upright part ahead of the fuel tank and a pair of upright rearwardly extending wing parts respectively at the sides of the fuel tank; and supporting strap means embracing the fuel tank and secured to the shield structure at inner portions of said shield structure.

2. In a vehicle having a fore-and-aft body including a front end and an internal-combustion engine carried by the body in rearwardly spaced relation to the front end, the improvement comprising: an upright transverse radiator carried by the body immediately ahead of the engine; an air cleaner positioned immediately ahead of the radiator; a fuel tank positioned immediately ahead of the air cleaner; an upright shield carried by and rising from the front end of the body ahead of and in protective relation to the fuel tank; and tie means extending fore-and-aft between and connected to the shield and the radiator and including portions at opposite sides of and supportingly engaging the air cleaner and fuel tank.

3. The invention defined in claim 2, including: fore-and-aft wing parts integral with the shield and extending rearwardly respectively at opposite sides of the fuel tank, each wing part having a generally upright terminal rear edge short of the rear part of the fuel tank; a first pair of side panels secured respectively to the wing parts and extending rearwardly from the rear terminal edges thereof, said panels respectively having rear terminal edges lying in a transverse plane ahead of the air cleaner; and a pair of side sheet sections extending forwardly respectively from opposite sides of the radiator to said terminal edges of the panels, said sections being removable to afford access to the air cleaner.

4. In a vehicle having a fore-and-aft body including a front end and an internal-combustion engine carried by the body in rearwardly spaced relation to the front end, the improvement comprising: an upright transverse radiator carried by the body immediately ahead of the engine; an air cleaner positioned immediately ahead of the radiator; a fuel tank positioned immediately ahead of the air cleaner; an upright shield carried by and rising from the front end of the body ahead of and in protective relation to the fuel tank; first strap means embracing the fuel tank and secured to the shield; an air cleaner support secured to said first strap means; second strap means secured to the air cleaner support and embracing the air cleaner; and radiator brace means secured to the radiator and to the air cleaner support.

5. In a vehicle having a fore-and-aft body, the improvement comprising: an upright shield of U-shaped section secured to and rising from the body, the bight of the U forming a transverse upright front wall and the legs of the U forming side walls extending rearwardly from the front wall; a generally upright mounting strip adjacent the rear edge of each side wall and providing a forwardly opening groove; a pair of side panels respectively providing rearward extensions of the side walls, each side panel having a front generally upright edge including a marginal flange turned inwardly and rearwardly and hooking rearwardly into the groove of the associated mounting strip; and a pair of removable means respectively securing the rear portions of the side panels to the body and normally holding the side panels against forward shifting relative to the side walls and thereby preventing unhooking of the side panel flanges from the mounting grooves.

6. The invention defined in claim 5, in which: each mounting groove is of substantial fore-and-aft depth and each side sheet flange cooperates with its groove to enable limited fore-and-aft adjustment of the side panel relative to its side wall; and each removable means includes a fore-and-aft slot accommodating said adjustment.

7. In a vehicle having an internal combustion engine and a body extending ahead of the engine, the improvement comprising: an upright radiator secured to the body ahead of the engine and having a top portion; an air cleaner ahead of the radiator and having a top portion at the level of the radiator top part; a fuel tank carried by the body ahead of the air cleaner and having a top part at the level of the top part of the air cleaner; an air intake conduit connected to the top part of the air cleaner and extending forwardly over the top part of the fuel tank and having a front inlet end; and an air outlet conduit connected to the top part of the air cleaner and extending rearwardly over the top part of the radiator and having its rear end connected to the intake system of the engine.

8. The invention defined in claim 7, including: a fore-and-aft hood structure carried by the body and separate from and overlying the engine, the radiator, the air cleaner, the fuel tank and the air cleaner conduits.

9. The invention defined in claim 8, in which: the hood structure has a forward downwardly directed portion ahead of the fuel tank and said portion has an opening therein in register with the inlet end of the air intake conduit.

10. The invention defined in claim 8, including: a front shield structure carried by the body ahead of the fuel tank and rising from the body and joining the hood in frontal protective relation to the fuel tank.

11. The invention defined in claim 10, in which: the hood structure has a forward portion directed downwardly to form a junction with the shield structure and said junction has an opening therein in register with the inlet end of the air intake conduit.

12. In a vehicle having an internal-combustion engine and a body part projecting ahead of the engine, the improvement comprising: a fuel tank carried on the body part in forwardly spaced relation to the engine; an upright transverse radiator carried by the body part ahead of the engine and in rearwardly spaced relation to the fuel tank to afford an accessory-receiving space; a fore-and-aft hood structure carried by the body part and overlying the engine, the radiator and the fuel tank and enclosing said space from above; front shield structure carried by and rising from the body part to and adjoining the hood structure ahead of the fuel tank; and removable side sections, one at each side of the body, extending rearwardly from the shield structure to the radiator and extending vertically between the hood structure and the body part to enclose said accessory-receiving space from the sides thereof.

13. In a vehicle having a fore-and-aft body including a front end, the improvement comprising: a fuel tank carried by the body adjacent to but spaced rearwardly from said front end; a wrap-around shield structure of U-shaped section having a terminal lower base secured to the body at the front end thereof and including a transverse upright part ahead of the fuel tank and a pair of upright rearwardly extending wing parts respectively at the sides of the fuel tank; and supporting means connecting the fuel tank to the shield structure.

14. In a vehicle having a body including an internal-combustion engine and front and rear body parts respectively ahead of and behind the engine, the improvement comprising: an upright front shield structure secured to and rising from the front body part, said structure having a marginal upper edge portion; a hood overlying the engine and having a rear part proximate to the rear body part and a front portion proximate to the upper marginal edge portion of the shield structure; means mounting the hood on the body parts for fore-and-aft shifting between secured and released positions, including bayonet-type securing means cooperative between the front portion of the hood and the upper marginal edge portion of the shield structure and operative in the secured position of the hood to prevent upward separation of the hood from the shield structure and operative in the released position of the hood to enable such upward separation, and releasable means cooperative between the rear hood and body parts normally operative to hold the hood against fore-and-aft shifting to its released position.

15. In a vehicle having a fore-and-aft body including a front end, the improvement comprising: shield structure including a base having front, rear and opposite side portions and a shield element of U-shaped section made up of a transverse front part secured to and rising from the base front portion and opposite wing parts secured respectively to and rising from the base side portions and joined to the front part; a fuel tank embraced by the U-shaped shield element; an air cleaner disposed immediately rearwardly of the fuel tank; support means removably connecting the tank to the shield element; air cleaner support means interposed between the air cleaner and said tank; a pair of rigid support members secured respectively to the shield element wing parts and extending rearwardly and inwardly and secured to the air cleaner support; and means removably mounting the air cleaner on said air cleaner support.

16. Shield structure for the front end of a vehicle having an engine and a radiator, comprising: a base for mounting on the vehicle ahead of the engine and radiator and having front, rear and opposite side portions; an upright shield element of U-shaped section secured to the base and including an imperforate transverse front part rising from the base front portion, and opposite wing parts rising respectively from the base side portions and secured to and extending rearwardly from the front part toward the base rear portion; means at the upper end of said front part for admitting air to the engine; and means in the wing parts for admitting air to the radiator.

17. In a vehicle having a fore-and-aft body including a front end, the improvement comprising: an upright cylindrical fuel tank carried at said front end; a wrap-around shield structure of U-shaped section having a base secured to the body at the front end thereof and including a transverse upright part ahead of the fuel tank and a pair of integral upright rearwardly extending wing parts respectively at the sides of the fuel tank; supporting strap means embracing the fuel tank and secured to the shield structure at inner portions of said shield structure; a front steerable wheel support secured to the body below the fuel tank; and a supporting pad on said support and engaging the bottom of the fuel tank to sustain said tank from below.

18. In a vehicle having a fore-and-aft body including a front end, the improvement comprising: a fuel tank carried at said front end; a wrap-around shield structure of U-shaped section having a base secured to the body at the front end thereof and including a transverse upright part ahead of the fuel tank and a pair of integral upright rearwardly extending wing parts respectively at the sides of the fuel tank; supporting means connecting the fuel tank to the shield structure; a front steerable wheel support secured to the body below the fuel tank; and a supporting pad on said support and engaging the bottom of the fuel tank to sustain said tank from below.

19. In a vehicle having a fore-and-aft body including a front end and in internal-combustion engine spaced rearwardly of the front end, the improvement comprising: a transverse upright radiator immediately ahead of the engine and rearwardly of the front end; a fuel tank carried by the body at the front end; upright shield structure secured to and rising from the body at the front end thereof and including a front portion ahead of the fuel tank and opposite fore-and-aft side sheets enclosing the radiator and fuel tank respectively at opposite sides; fore-and-aft hood structure overlying the engine, radiator and fuel tank and secured to the shield structure.

References Cited in the file of this patent

UNITED STATES PATENTS

| | | |
|---|---|---|
| 1,111,526 | Coppock | Sept. 22, 1914 |
| 1,205,982 | Eason et al. | Nov. 28, 1916 |
| 2,099,789 | Baker et al. | Nov. 23, 1937 |
| 2,143,727 | Baker | Jan. 10, 1939 |
| 2,203,407 | Donaldson | June 4, 1940 |
| 2,325,729 | Allin | Aug. 3, 1943 |
| 2,336,089 | Gould | Dec. 7, 1943 |
| 2,402,449 | Rockwell | June 18, 1946 |
| 2,612,233 | Newell | Sept. 30, 1952 |
| 2,633,926 | Minor | Apr. 7, 1953 |
| 2,684,204 | Lamb | July 20, 1954 |
| 2,715,394 | Humpola et al. | Aug. 16, 1955 |

FOREIGN PATENTS

| | | |
|---|---|---|
| 1,030,862 | France | Mar. 18, 1953 |
| 868,399 | France | Sept. 29, 1941 |
| 218,244 | Switzerland | Mar. 2, 1942 |